United States Patent [19]

Matai et al.

[11] Patent Number: 4,876,536

[45] Date of Patent: Oct. 24, 1989

[54] PAGING RECEIVER WITH A LIGHT EMITTING ELEMENT FLASHING CIRCUIT

[75] Inventors: Masahiro Matai; Kazuyuki Tsunoda, both of Tokyo, Japan

[73] Assignee: NEC Corporation, Tokyo, Japan

[21] Appl. No.: 256,837

[22] Filed: Oct. 12, 1988

[30] Foreign Application Priority Data

Oct. 12, 1987 [JP] Japan ................................ 62-254566

[51] Int. Cl.[4] .......................... G08B 5/38; H04Q 7/02

[52] U.S. Cl. ................................ 340/825.440; 455/68; 455/154; 340/311.1

[58] Field of Search ....................... 340/825.44, 825.69, 340/825.71, 825.73, 825.74, 825.76, 815.03, 309.4, 311.1, 458, 331, 332, 766, 782; 307/38–41; 361/159; 455/68, 70, 154

[56] References Cited

U.S. PATENT DOCUMENTS 4,403,343 9/1983 Hamada ............................ 455/154
4,462,030 7/1984 Ishii ................................ 340/825.44
4,704,608 11/1987 Sato et al. ....................... 340/825.44
4,734,694 3/1988 Umetsu et al. ................. 340/825.44

FOREIGN PATENT DOCUMENTS 2554943 5/1985 France ........................... 340/815.03

*Primary Examiner*—Donald J. Yusko
*Assistant Examiner*—W. Crummer
*Attorney, Agent, or Firm*—Sughrue, Mion, Zinn, Macpeak & Seas

[57] ABSTRACT

A paging receiver or a miniature receiver having a light emitting flashing circuit is provided in which a single boosting coil is shared by two light emitting elements and therefore the number of boosting coils required is one-half the number of light emitting diodes.

12 Claims, 3 Drawing Sheets

FIG. 5A
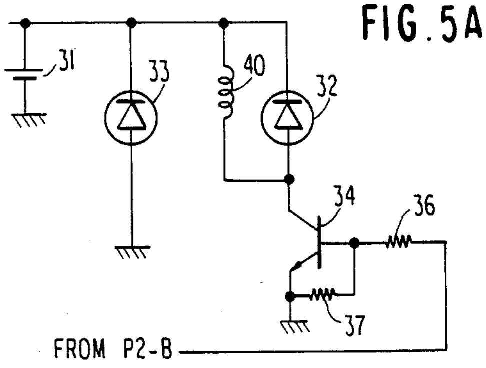
FIG. 5B
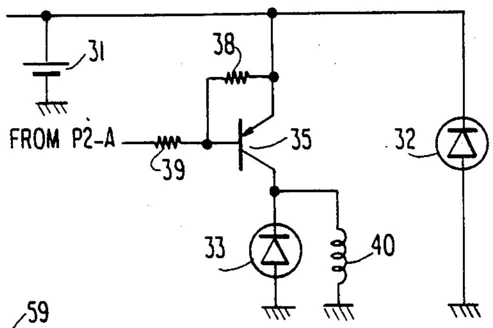
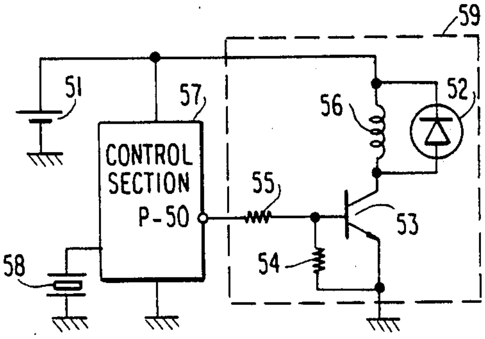
FIG. 6
PRIOR ART
FIG. 7
PRIOR ART
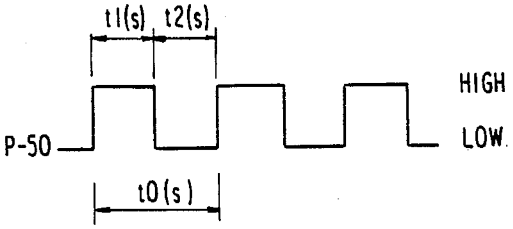

PAGING RECEIVER WITH A LIGHT EMITTING ELEMENT FLASHING CIRCUIT

BACKGROUND OF THE INVENTION

The present invention relates to a paging receiver having a circuit for flashing a light emitting element and, more particularly, to a paging receiver having a circuit for selectively flashing a plurality of light emitting elements.

A current trend in the radio paging art is toward a paging receiver or pager operable with a plurality of paging numbers and/or, to promote the use of the receiver in multiple locations, with a plurality of receive frequencies. In parallel with such a trend, means for alerting a person who carries a pager to the reception of a call and means for allowing the person to confirm a receive frequency being set have been proposed in a variety of forms. For example, alerting means which assigns a different tone or a light emitting element of a different color to each paging number is available. Also available is frequency confirming means which, when a person selects a particular receive frequency which matches a particular location, displays that frequency by causing a light emitting element of a particular color to flash.

The light emitting element used with the above-described type of alerting means or frequency confirming means is usually implemented by a light emitting diode (LED). While about 2-volt power supply is needed to turn on an LED, a 1-volt battery which is easy to replace is adopted in practice for powering an LED because a pager is usually carried by a person. It is therefore necessary to install in a pager a circuit for causing an LED to flash by boosting the output of the 1-volt battery.

An example of a circuit for flashing an LED as stated above is disclosed in Japanese Laid-Open Utility Model Publication (Kokai) No. 57-39156. The circuit shown and described in this Utility Model Publication includes a 1-volt battery and a coil which is connected in parallel with an LED. Energy generated by the 1-volt battery is charged in the coil and then discharged so that the resulting counter electromotive force causes the LED to glow. Such a procedure is repeated to turn on and off the LED periodically.

An attempt to implement a flashing circuit having a plurality of LEDs of different colors by the above-described technique would result in the need for the same number of flashing circuits as the number of LEDs. More specifically, when a flashing circuit using the same number of prior art circuits as the number of LEDs is simply applied to a pager, a prohibitive number of circuit parts are needed, especially the same number of boosting coils as the number of LEDs are required. Such numerous circuit parts obstruct the miniaturization of the pager. What impedes the miniaturization most is the large contour of the coil which is unavoidable in guaranteeing inductance necessary for boosting. Increasing the number of boosting coils in proportion to the number of LEDs would add to the overall size of a pager. This is also true with a case wherein a plurality of prior art flashing circuits are applied to the alerting means of a small-size receiver which is powered by a DC power supply.

SUMMARY OF THE INVENTION

It is therefore an object of the present invention to reduce the number of boosting coils built in a paging receiver of the type having a plurality of light emitting elements and a circuit for flashing such elements for the purposes of alerting the carrier and confirming the frequency It is another object of the present invention to reduce the number of boosting coils built in a small-size receiver of the type having a plurality of light emitting elements and a circuit for flashing such elements for the purposes of alerting the carrier and confirming the frequency.

In accordance with the present invention, there is provided a radio paging receiver having a circuit for flashing a light emitting element, comprising a DC power supply and a coil element. In addition, the receiver includes a light emitting element. In addition, the receiver includes, a light emitting element circut comprising; a first light emitting element connected at a first terminal to the DC power supply means and at a second terminal to one end of the coil element, and a second light emitting element connected at a third terminal to the other end of the coil element and at a fourth terminal to ground such that the second light emitting element is identical with the first light emitting element with respect to direction. Further included in the radio paging receiver are: first switching means connected between the second terminal and ground; second switching means connected between the third terminal and the DC power supply means; radio signal receiving means for receiving a radio signal to produce a receive signal; and memory means for storing first and second paging numbers which are assigned to said paging receiver. A detection means for comparing a receive paging number contained in the receive signal with the first and second paging numbers is also included. If the receive paging number is identical with first paging number, a first detect signal is produced similarly the receive paging number is identical with the second paging number a second detect signal is produced. Finally, control means are included for continuously turning on the first switching means and repetitively turning on and off the second switching means in response to the first detect signal and, for repetitively turning on and off the first switching means and continuously turning on the second switching means in response to the second detect signal.

In accordance with the present invention, a small-size receiver is also provided having a circuit for flashing a light emitting element for informing a person that a call has been received or for a similar purpose, comprising a DC power supply means, a coil element, and receiving means for receiving signals to produce a first and a second receive signal. Also included are flashing circuit means including a first light emitting element which is connected at a first terminal to the DC power supply means and at a second terminal to one end of the coil element such that the first light emitting element is opposite to a voltage applied from the DC power source with respect to a direction, as well as a second light emitting element connected at a third terminal to the other end of the coil element and at a fourth terminal to ground such that the second light emitting element is identical with the first light emitting element with respect to direction. In addition first switching means connected between the second terminal and ground are included to, repetitively turn on and off in response to a first control signal, and to continuously turn on in response to a second control signal. Second switching are connected between the third terminal and the power supply means for repetitively turning on and off in response to a third control signal, and for continuously turning on in response to a fourth control signal. Finally, the receiver includes control means for producing, in response to the first receive signal, the second and third control signals and, for supplying them to the first and second switching means, respectively. The control means also produces in response to the second receive signal, the first and fourth control signals, and supplies them to the first and second switching means, respectively.

BRIEF DESCRIPTION OF THE DRAWINGS

FIGS. 5A and 5B are equivalent circuit diagrams each showing a condition wherein each LED in FIG. 3 is turned on;

FIG. 6 is a diagram showing a prior art circuit for flashing a light emitting element; and FIG. 7 is a timing chart representative of signals which are fed from a control section shown in FIG. 6.

DETAILED DESCRIPTION OF THE PREFERRED EMBODIMENT

Figure 1:
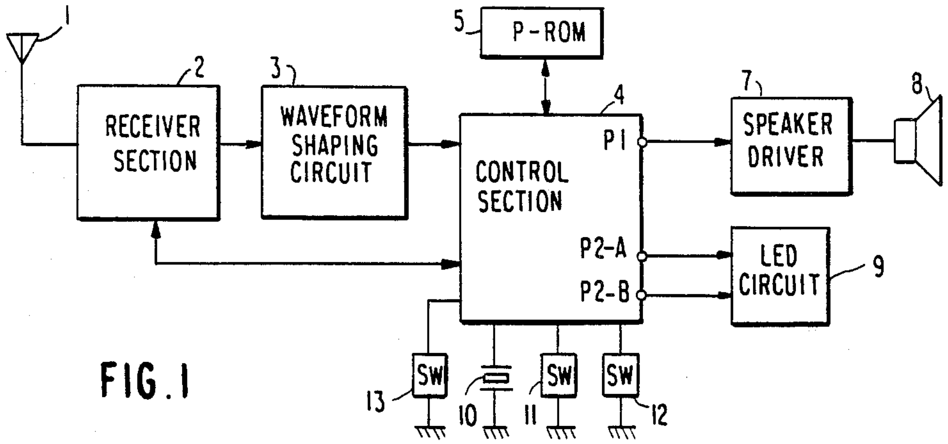
FIG. 1 is a schematic block diagram showing a paging receiver with a flashing circuit embodying the present invention.

To better understand the present invention, a brief reference will be made to a prior art light emitting element flashing circuit, shown in FIG. 6. The flashing circuit includes a 1-volt battery 51 for powering the circuit, an LED 52, and a transistor 53 for driving the LED 52. The bias of the transistor 53 is determined by resistors 54 and 55. A coil 56 is provided for boosting the 1-volt power supply. Let the circuitry consisting of the LED 52, transistor 53, resistors 54 and 55 and coil 56 be collectively called an LED circuit 59 for convenience. The flashing circuit further includes a control section 57 and a clock generator 58 for delivering a timing signal to the control section 57.

In operation, the control section 57 divides the frequency of the output signal of the clock generator 58 to produce a pulse signal whose frequency is $1/t_0$ hertz, as shown in FIG. 7. This pulse signal is applied to the LED circuit 59. For the duration of $t_1$ shown in FIG. 7, a current flows through the transistor 53 to charge the coil 56. In this condition, the LED 52 is not turned on. For the next duration of $t_2$, the current to the transistor 53 is interrupted so that the LED 52 is turned on by counter electromotive force which is generated by the coil 56. Such a procedure is repeated periodically to turn on and off the LED 52 repeatedly.

Implementing a flashing circuit having a plurality of LEDs of different colors by the above-described technique would result in the need for the same number of flashing circuits as the number of LEDs, as discussed earlier. More specifically, when a flashing circuit using the same number of prior art circuits as the number of LEDs is simply applied to a pager, a prohibitive number of circuit parts are needed, especially since the same number of boosting coils as the number of LEDs are required. Such a number of circuit parts are an obstacle to the miniaturization of a pager.

Referring to FIGS. 1 to 5, a paging receiver embodying the present invention is shown which eliminates the drawback as discussed above. As shown in FIG. 1, the paging receiver or pager includes an antenna 1, a receiver section 2, a waveform shaping circuit 3, a control section 4, a PROM (Programmable-Read Only Memory) 5, a speaker driver 7, a speaker 8, and an LED circuit 9. A clock generator 10 and switches 11–13 are also included in the paging receiver.

Figure 2:
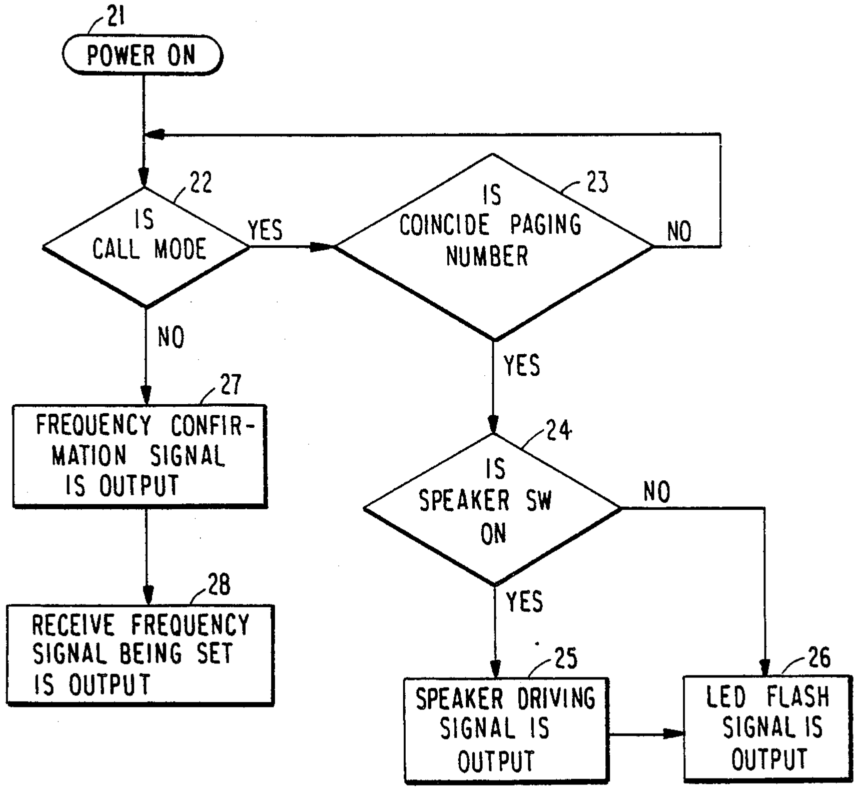
FIG. 2 is a flow chart demonstrating a specific operation of a control section shown in FIG. 1.

In FIGS. 1 and 2, after a power switch, not shown, of the pager has been turned on (step 21), a radio signal coming in through the antenna 1 is amplified and demodulated by the receiver section 2. A demodulated output of the receiver section 2 is shaped by the waveform shaping circuit 3 into a waveform which can be processed by the control section 4. When a switch 11 connected to the control section 4 is held in a call mode (step 22), the control section 4 compares an output of the waveform shaping circuit 3 with paging numbers which are assigned to the receiver, in response to a timing signal which is delivered thereto from a clock generator 10. Assume for purposes of illustration that the PROM 5 stores, for example, two different paging numbers which will be referred to below as an A call and a B call.

When the signal from the waveform shaping circuit 3 is not identical with any of the two paging numbers (step 23), the program returns to the step 22. When the signal from the circuit 3 is identical with one of the paging numbers (step 23) and if a speaker switch 12 is in an ON state (step 24), the control section 4 delivers a speaker drive signal to the speaker driver 7 via a port P1 (step 25). In response, the speaker 8 produces an alert tone for notifying the user of the pager that a call has been received. Further, the control section 4 feeds LED flash signals which are synchronous with the speaker drive signal to the LED circuit 9 via ports P2-A and P2-B (step 26). In the illustrative embodiment, the LED circuit 9 is constituted by two LEDs and circuitry for driving them. The LED flash signals fed to the LED circuit 9 via the ports P2-A and P2-B cause one of the two LEDs to flash. To facilitate distinction, the LEDs are different in color from each other. If the speaker switch 12 is in an OFF state at the step 24, the control section 4 executes the step 26 without delivering the speaker drive signal.

Each of the speaker drive signal outputted via the port Pl and the LED flash signals outputted via the ports P2-A and P2-B is changed depending upon the kind of a call, i.e. the A call or B call. Such a change allows the A-and B-calls to be discriminated from each other by changing the alert tones from the speaker 8 and flashing only one of the two LEDs.

When the switch 11 is in a frequency confirmation mode which is distinguished from the call mode (step 22), the control section 4 outputs through the ports P2-A and P2-B frequency confirm signals associated with a particular receive frequency being set (step 26). Further, the control section 4 delivers to the receiver section 2 a receive frequency signal which is set by a switch 13 (step 28). In response, the receiver section 2 sets up a receive frequency. A set frequency confirm signal is fed to the LED circuit 9 at the intervals of frequency set to allow a person to see the frequency being set. Assuming that two different receive frequencies are available with the pager, the set frequency confirm signal may be implemented by waveforms which are individually identical with the previously stated two LED flash signals which are in turn individually associated with the A- and B-calls.

In FIG. 1, it will be apparent that the various sections of the pager are individually supplied with power by a 1-volt battery, although not shown in the figure.

The LED circuit 9 shown in FIG. 1 is constructed and operated as described in detail hereinafter with reference to FIGS. 3 to 5.

Figure 3:
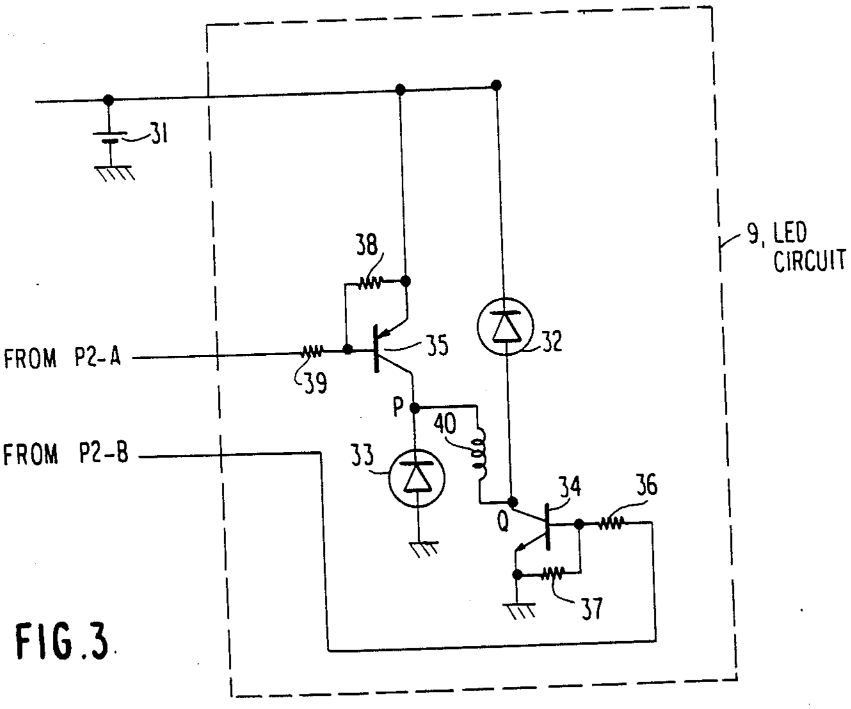
FIG. 3 is a diagram representative of an LED circuit also shown in FIG. 1.

In FIG. 3, the LED circuit 9 is energized by a 1-volt battery 31. LED circuit 9 includes LEDs 32 and 33 which are different in color from each other, and transistors 34 and 35. Each of the transistors 34 and 35 has two different functions, i.e., a switching function and an LED driving function. To drive the LEDs 32 and 33, each of the transistors 34 and 35 has a high current amplifying ability. The LED flash signals individually outputted by the control section 4, FIG. 1, are applied to the base electrodes of the transistors 35 and 34 via the port P2-A and a resistor 39 and via the port P2-B and a resistor 36, respectively. Resistors 36 to 39 are provided for determining the bias of the transistors 34 and 35. The reference numeral 40 designates a coil for boosting the power supply adapted for the LEDs 32 and 33.

Figure 4A:
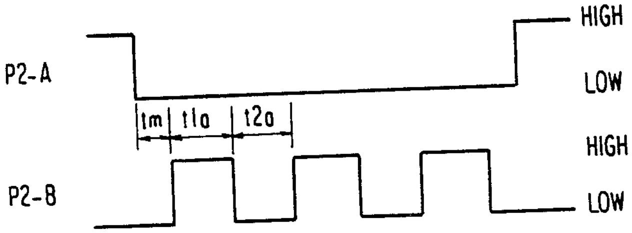
FIGS. 4A and 4B are timing charts showing signals which are fed from the control section to the LED circuit.

Assume for example that only the LED 32 is to flash in response to the A-call when the switch 11, FIG. 1, is in the call mode, or in response to a receive frequency, when the switch 11 is in the frequency confirm mode. The pager is operable with any frequency $f_1$ and a different frequency $f_2$ which may be selected as desired. In such a case, signals shown in FIG. 4A are individually delivered to the LED circuit 9 via the ports P2-A and P2-B. More specifically, the LED flash signal from the port P2-A is changed from a high level to a low level to feed a current through the transistor 35, whereby a voltage appearing at a point P shown in FIG. 3 becomes substantially equal to the voltage of the 1-volt battery 31. The resulting condition is shown in an equivalent circuit in FIG. 5A. Subsequently, as the other signal shown in FIG. 4A is fed to the LED circuit 9 via the port P2-B, a current flows through the transistor 34 for a duration indicated by a time $t_{1a}$ with the result that the coil 40 is charged. During a period of time of $t_{2a}$, the current stops flowing through the transistor 34 and the resulting counter electromotive force causes only the LED 32 to turn on. The waveform appearing over the consecutive periods of the $t_{1a}$ and $t_{2a}$ is repeated to flash only the LED 32. In this instance, the LED 33 does not turn on or flash because no current flows therethrough.

Figure 4B:
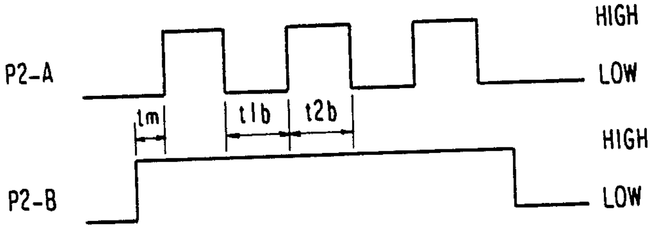

When the B-call is received with the call mode being selected by the switch 11 or when the frequency $f_2$ different from the frequency $f_1$ is selected with the switch 11 remaining in the frequency confirm mode, only the LED 33 flashes. In this case, signals shown in FIG. 4B are individually outputted via the ports P2-A and P2-B. More specifically, the signal from the port P2-B is changed from a low level to a high level to cause a current to flow through the transistor 34. Then, the potential at a point Q of FIG. 3 becomes substantially equal to ground potential. The resulting condition is shown in an equivalent circuit in FIG. 5B. This causes only the LED 33 to flash by exactly the same principle as has been discussed in relation to the LED 32. In this case, the LED 32 does not turn on or flash because no current flows therethrough.

As shown in any of FIGS. 4A and 4B, the signal for turning on any of the LED 32 or 33 is fed only after the transistor associated therewith has been fully switched, i.e., a short time lag $t_m$ exists.

In summary, it will be seen that the present invention provides a paging receiver or a small-size receiver having a light emitting element flashing circuit in which a single boosting coil is shared by two light emitting elements and, hence, the number of boosting coils required is only one half the number of LEDs. While a switching circuit implemented as a single package for transistors and a package accommodating a plurality of LEDs are put to practical use today, noticeably reducing the size of a coil is impractical because it has a mechanical structure. In this respect, the decrease in the number of coils attainable with the present invention contributes a great deal to the miniaturization of a small-size receiver.

Various modifications will become possible for those skilled in the art after receiving the teachings of the present disclosure without departing from the scope thereof. For example, while the pulse signal outputted by the control section 4 for flashing the LEDs 32 and 33 is assumed to have a duty of about 50 percent, the duty may be varied to turn on the LEDs 32 and 33 either continuously or intermittently as desired for the purpose of implementing greater number alerting states and a greater number of frequencies which may be confirmed. Further, the LED circuit discussed in detail is applicable not only to a paging receiver but also to a small-size receiver which is powered by a DC power supply for alerting a person to the reception of a signal and other purposes.

What is claimed is:

1. A radio paging receiver comprising:

DC power supply means;

a coil element;

a light emitting element circuit comprising a first light emitting element connected at a first terminal to said DC power supply means and connected at a second terminal to a first end of said coil element;

a second light emitting element connected at a third terminal to a second end of said coil element and connected at a fourth terminal to ground such that said second light emitting element is identical with said first light emitting element with respect to direction;

first switching means connected between said second terminal and ground;

second switching means connected between said third terminal and said DC power supply means;

radio signal receiving means for receiving a radio signal to produce a receive signal;

memory means for storing first and second paging numbers which are assigned to said paging receiver;

detection means for comparing a receive paging number contained in said receive signal with said first and second paging numbers, wherein a first detect signal is produced when said receive paging number is identical with said first paging number and wherein a second detect signal is produced when said receive paging number is identical with said second paging number; and control means for continuously turning on said first switching means and repetitively turning on and off said second switching means in response to said first detect signal and, for repetitively turning on and off said first switching means and continuously turning on said second switching means in response to said second detect signal.

2. A radio paging receiver as claimed in claim 1, wherein each of said first and second light emitting elements comprises a light emitting diode.

3. A radio paging receiver as claimed in claim 1, wherein said first and second switching means comprise an NPN transistor and a PNP transistor, respectively.

4. A radio paging receiver as claimed in claim 1, wherein said DC power supply means comprises a 1-volt battery.

5. A radio paging receiver as claimed in claim 1, further comprising alert means for outputting first and second alert tones in response to said first and second detect signals, respectively, said first and second alert tones being different from each other.

6. A radio paging receiver as claimed in claim 5, wherein said alert means comprises a speaker.

7. A radio paging receiver as claimed in claim 5, further comprising means for suspending the operation of said alert means.

8. A radio paging receiver as claimed in claim 7, further comprising:

receive frequency setting means for setting said radio signal receiving means at a predetermined receive frequency; and means responsive to said means for suspending the operation of said alert means for continuously turning on one of said first and second switching means and repetitively turning on and off the other of said first and second switching means on the basis of said predetermined receive frequency.

9. A small-size receive comprising:

DC power supply means;

a coil element;

receiving means for receiving signals to produce a first and a second receive signal;

flashing circuit means including a first light emitting element which is connected at a first terminal to said DC power supply means and connected at a second terminal to a first end of said coil element such that said first light emitting element is opposite to a voltage applied from said DC power source with respect to a direction;

a second light emitting element connected at a third terminal to a second end of said coil element and at a fourth terminal to ground such that said second light emitting element is identical with said first light emitting element with respect to direction;

first switching means connected between said second terminal and ground, said first switching means repetitively turning on and off in response to a first control signal and continuously turning on in response to a second control signal;

second switching means connected between said third terminal and said power supply means, said second switching means repetitively turning on and off in response to a third control signal and continuously turning on in response to a fourth control signal; and control means for producing, in response to said first receive signal, said second and third control signals, and for supplying said second and third control signals to said first and second switching means, respectively, said control means further producing, in response to said second receive signal, said first and fourth control signals, and for supplying said first and fourth control signals to said first and second switching means, respectively.

10. A receiver as claimed in claim 9, wherein said first and second light emitting elements each comprises a light emitting diode.

11. A receiver as claimed in claim 10, wherein said first and second switching means comprise an NPN transistor and a PNP transistor, respectively.

12. A receiver as claimed in claim 9, wherein said DC power supply means comprises a 1-volt battery.

* * * * *

UNITED STATES PATENT AND TRADEMARK OFFICE
CERTIFICATE OF CORRECTION

PATENT NO. : 4,876,536

DATED : October 24, 1989

INVENTOR(S) : Matai et al

It is certified that error appears in the above-identified patent and that said Letters Patent is hereby corrected as shown below:

Column 2, lines 12-14, delete "the purposes of alerting the carrier and confirming the frequency" and insert --alerting and other purposes--;

Column 2, lines 18 and 19, delete "In addition, the receiver includes a light emitting element.";

Column 5, line 31, delete "frequency," and insert --frequency $f_1$--;

Column 7, line 18, after "respectively," insert --and wherein--; and

Column 7, line 19, delete "being" and insert --are--.

Signed and Sealed this

Ninth Day of October, 1990

*Attest:*

HARRY F. MANBECK, JR.

*Attesting Officer* *Commissioner of Patents and Trademarks*